Aug. 9, 1955 — E. V. GARNETT ET AL — 2,715,014
VEHICLE DERRICK
Filed March 26, 1954 — 4 Sheets-Sheet 4
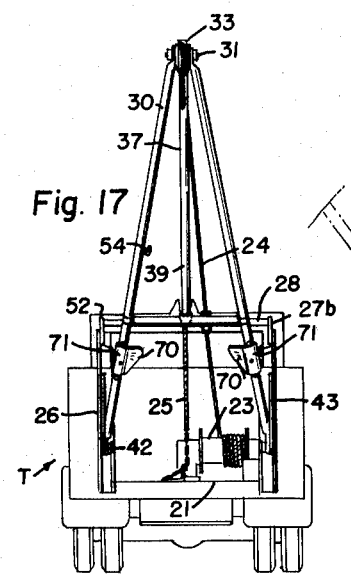
Fig. 17
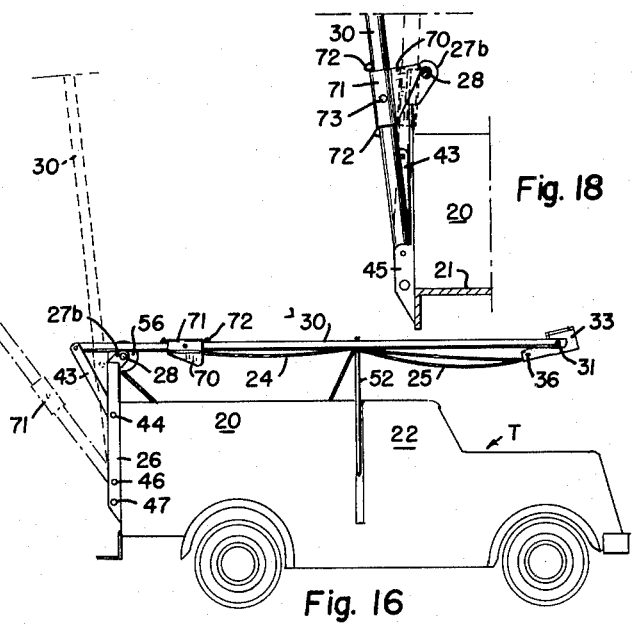
Fig. 18
Fig. 16
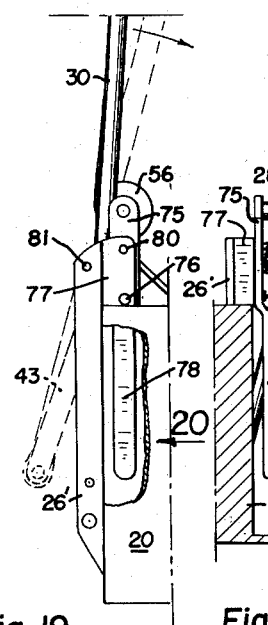
Fig. 19
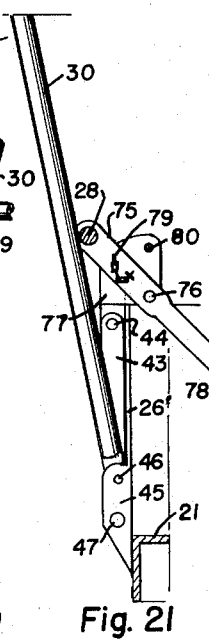
Fig. 20
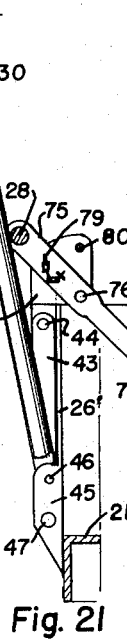
Fig. 21
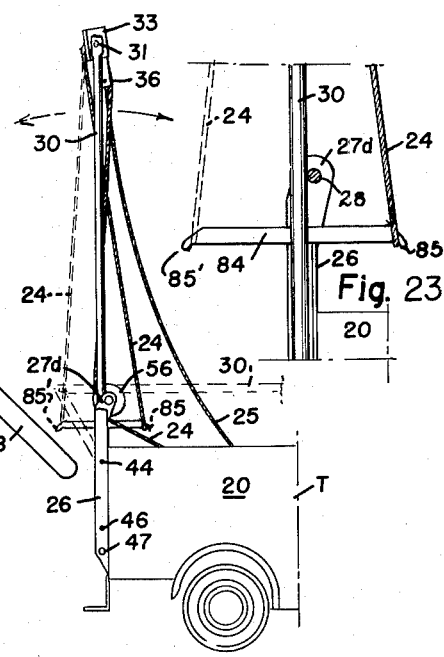
Fig. 22
Fig. 23
INVENTOR.
Edward V. Garnett
BY
Horace B. Van Valkenburgh
ATTORNEY

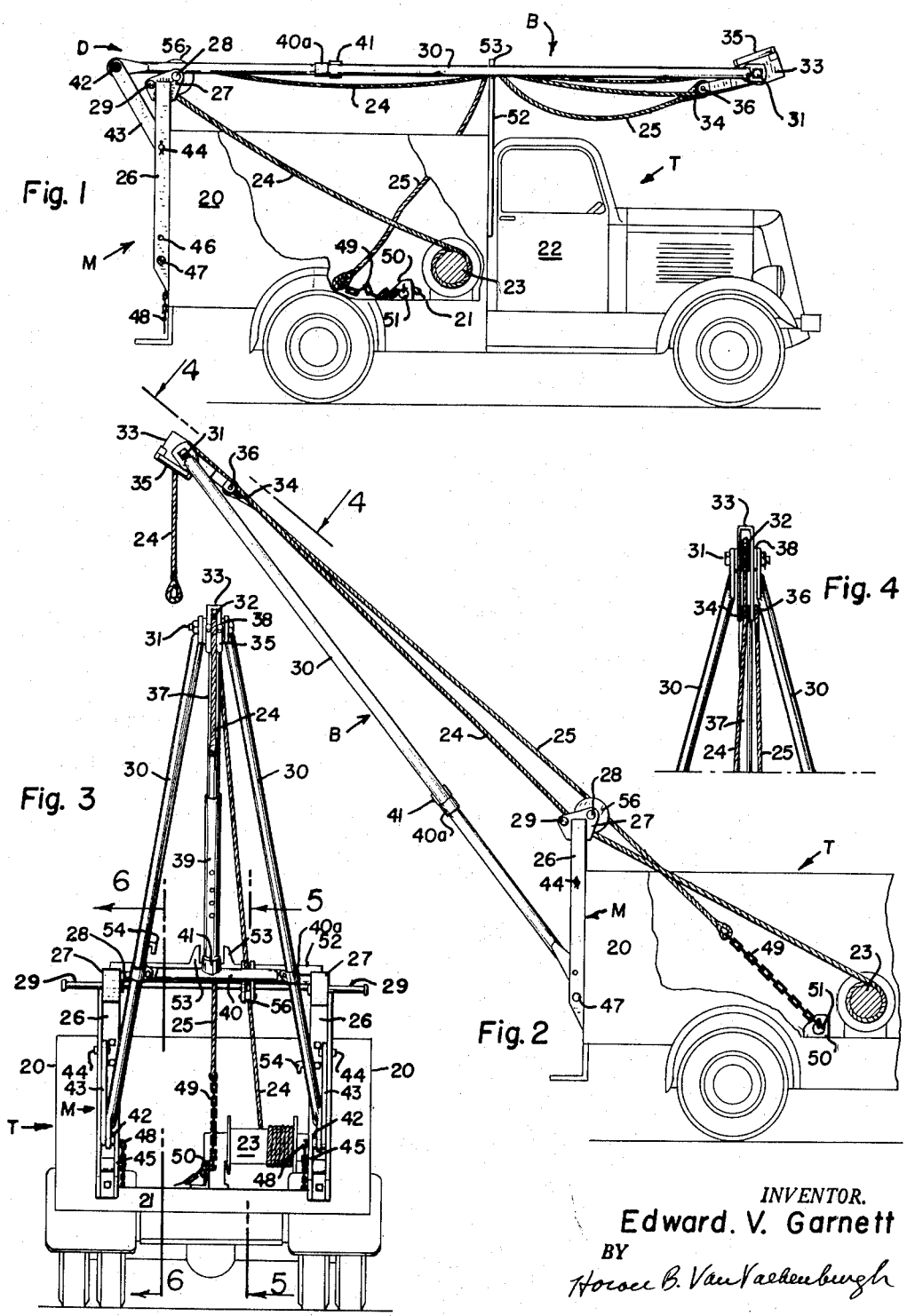

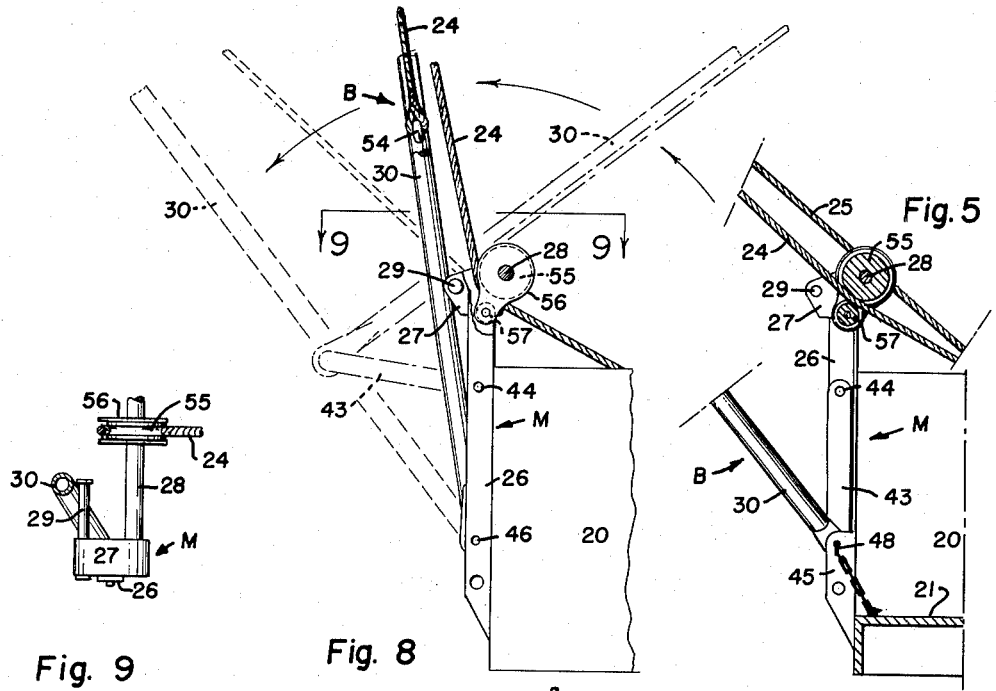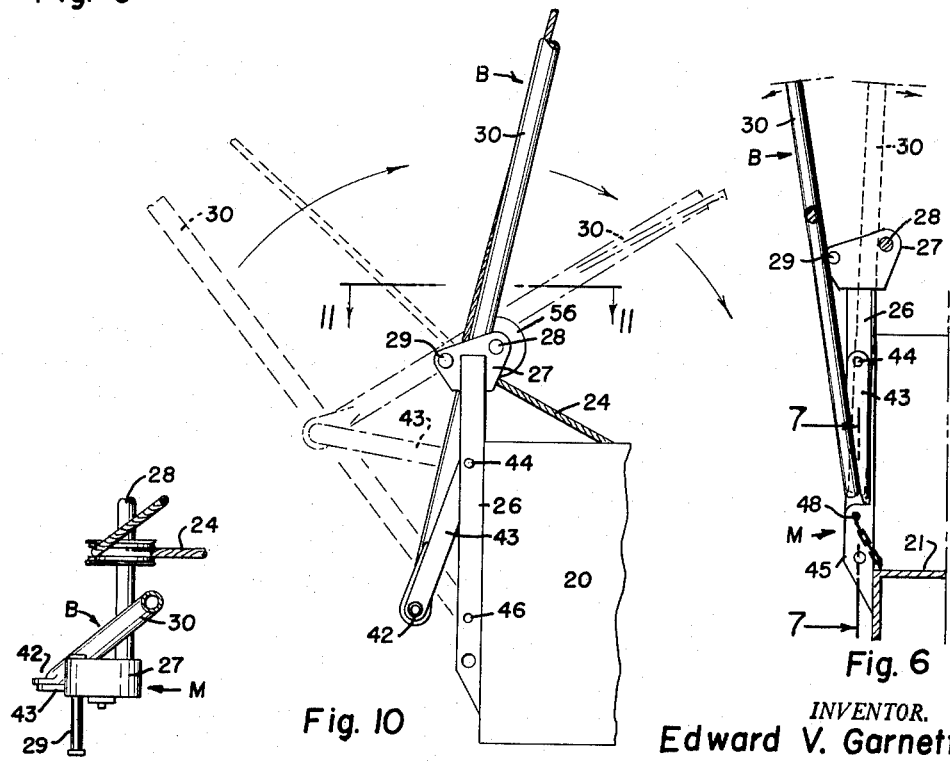

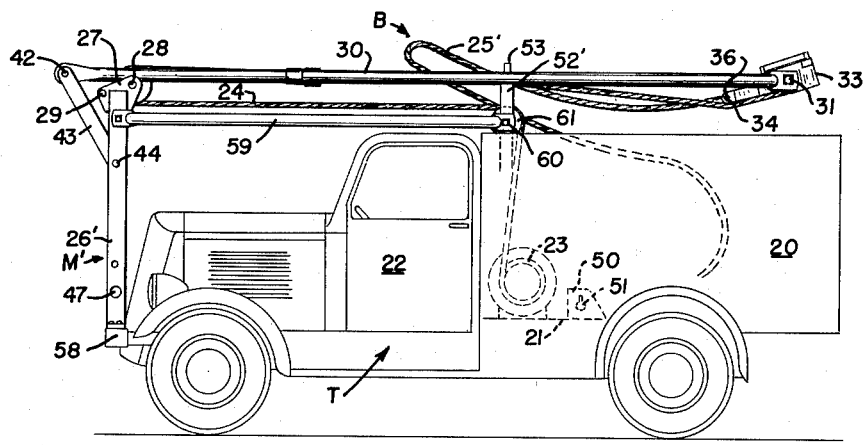
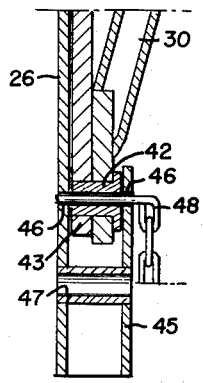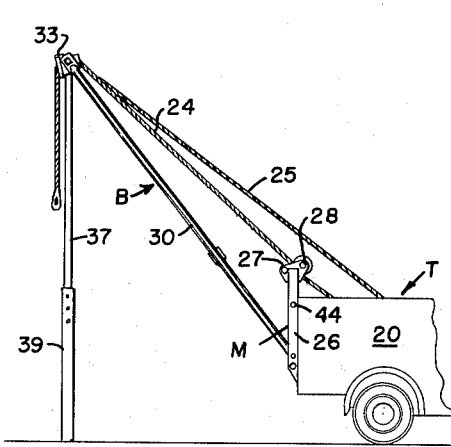
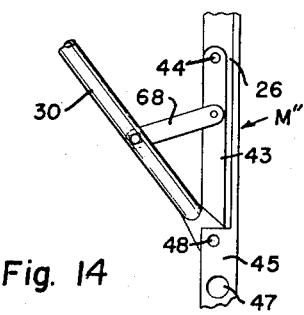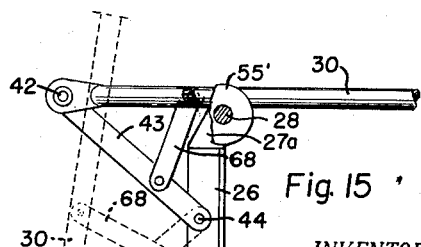

United States Patent Office 2,715,014
Patented Aug. 9, 1955

2,715,014

VEHICLE DERRICK

Edward V. Garnett and George N. Gromer, Denver, Colo., assignors to Truck Equipment Company, Denver, Colo., a corporation of Colorado Application March 26, 1954, Serial No. 418,961

19 Claims. (Cl. 254—139.1)

This invention relates to derricks, and more particularly to a derrick which is especially adapted to be mounted upon a truck or other vehicle as a portable unit.

In a type of derrick previously utilized as a portable unit for handling telephone poles and the like, two legs are connected together at their upper ends by a pin, on which is mounted a sheave, and are attached at their lower ends to the rear end of the truck at spaced positions adjacent the truck sides. These two legs are normally supported in fixed position at a suitable rearward angle by a third leg, which is attached at its upper end to the upper ends of the rear legs and at its lower end to the bed or body of the truck, at a point several feet forwardly from the rear end. A cable which passes over the sheave is used for lifting and lowering loads, and may be operated by a power driven winch, also mounted on the bed of the truck. The third leg may be made in three sections, with the upper and lower sections telescoping into the central section and thereby permitting the third leg to be removed and disassembled, as for use as a permanent support for the upper end of the two rear legs, with the lower end of the third leg, or a portion thereof, resting on the ground rearwardly of the truck. This provides a solid ground support for the sheave when a pole is being pulled from a hole. Such a derrick may extend for several feet into the air, such as 18 feet, and therefore cannot remain in upright position while the truck is being driven along any road with overhead clearance less than the height to which the derrick extends. Therefore, such a derrick must be taken down each time the truck is to be moved along such a road, or anywhere else that sufficient clearance does not exist. While the parts of this derrick may be stored in or on the truck, the derrick must be erected and dismounted primarily by hand, which is not only time consuming, but also involves some danger to workmen, since the rear legs must be held in elevated position, as by pikes, rods, or the like, while the third leg is being fastened or unfastened. In dismounting the derrick, after the third leg is unfastened, the rear legs have a tendency to fall suddenly rearwardly from the truck. Also, due to the stationary position of the rear legs, the most advantageous position of the rear legs for operation cannot always be obtained.

Among the objects of this invention are to provide a new and improved derrick which may be mounted as on a vehicle such as a truck; to provide such a derrick which is particularly adapted to be attached to a truck at one end thereof with the boom of the derrick extending outwardly therefrom at selected inclinations when in use; to provide such a derrick which does not require disassembly for storage or assembly for use; to provide such a derrick which may be mounted on a truck through relatively simple attachments or brackets; to provide such a derrick in which the principal parts of a previous type of derrick may be utilized; to provide such a derrick, the boom of which may be moved between storage and use positions by a lifting cable winch; to provide one form of such derrick which requires no manual effort for movement of the boom between storage and use positions, and vice versa; to provide another form of such derrick which is somewhat simplified and may require slight manual effort at certain points for movement of the boom between use and storage positions and vice versa; to provide additional forms of such derrick which have various advantages; to provide such a derrick, the boom of which may be swung from an inclined operative position to a flat position atop the truck for storage and transportation; to provide such a derrick, the boom of which is adapted to be swung from an operating position beyond the truck to a storage position over the truck by a simple and effortless manipulation of a derrick hoisting cable; to provide such a derrick which is especially adapted for use as a pole derrick, used for the placing and pulling of telephone and light poles and the like; and to provide such a derrick which, in general, is simple, economical, sturdy and rugged in construction and is adapted for different types of use and for installation on different types of vehicles.

Additional objects of this invention and the novel features thereof, will become apparent from the description which follows, taken in connection with the accompanying drawings, in which:

Fig. 1 is a side elevation of a panel type truck and a derrick, constructed in accordance with this invention and forming one embodiment thereof, mounted on the truck and pivotally attached to the rear end thereof, with the derrick boom shown in a flat or storage position over the truck and with portions of the truck being broken away to show certain parts otherwise hidden from view;

Fig. 2 is a fragmentary side elevation, showing the rear portion of the truck of Fig. 1, and the derrick boom extending rearwardly from the truck in an operating, or use position;

Fig. 3 is a rear elevation of the truck and derrick, as shown in Fig. 2;

Fig. 4 is a fragmentary oblique view, taken along line 4—4 of Fig. 2;

Fig. 5 is a fragmentary vertical section, taken along line 5—5 of Fig. 3, but on an enlarged scale;

Fig. 6 is a fragmentary vertical section, taken along line 6—6 of Fig. 3 but on an enlarged scale, showing the derrick boom in a nearly upright position, with another position of the boom indicated in dotted lines;

Fig. 7 is a fragmentary vertical section, taken along line 7—7 of Fig. 6 but on a further enlarged scale;

Fig. 8 is a fragmentary side elevation of a rear portion of the truck and showing various positions of the derrick boom during movement from storage to use positions;

Fig. 9 is a fragmentary horizontal section, taken along line 9—9 of Fig. 8;

Fig. 10 is a fragmentary side elevation similar to Fig. 8, but showing various positions of the derrick boom during movement from use or operating position to storage position;

Fig. 11 is a fragmentary horizontal section taken along line 11—11 of Fig. 10;

Fig. 12 is a fragmentary side elevation similar to Fig. 2 but on a reduced scale, showing the derrick boom supported by a supplemental column for use in pulling poles and similar operations;

Fig. 13 is a side elevation of a truck on which is mounted a derrick forming a still further embodiment of this invention, the derrick being mounted upon the front end of the truck and the boom being shown in storage position;

Fig. 14 is a fragmentary side elevation of a portion of the derrick boom and an alternating supporting bracket, forming a further embodiment of this invention;

Fig. 15 is a fragmentary side elevation, similar to Fig. 14, but showing other positions of the derrick boom during movement between use and storage positions and showing a higher portion of the supporting bracket;

Fig. 16 is a side elevation of a truck, similar to Fig. 1, on which is mounted a derrick forming still another embodiment of this invention, the derrick boom being shown in storage position in full lines and in other positions in dotted and dash lines;

Fig. 17 is a rear elevation of the truck and derrick of Fig. 16, showing the derrick in operating position;

Fig. 18 is a fragmentary vertical section, similar to Fig. 6, illustrating certain details of construction and operation of the derrick of Fig. 16;

Fig. 19 is a fragmentary side elevation, similar to Fig. 10, illustrating still another embodiment of this invention with certain parts broken away to show other parts more clearly and with certain elements thereof adjusted for movement of the boom from operating to storage positions;

Fig. 20 is a fragmentary vertical section of a portion of the derrick of Fig. 19, taken from the position of arrow 20 of Fig. 19;

Fig. 21 is a fragmentary vertical section, similar to Fig. 6, illustrating the derrick of Fig. 19 adjusted for movement of the boom from storage to operating positions;

Fig. 22 is a fragmentary side elevation of the rear portion of a truck and derrick, similar to Fig. 2, but illustrating a further embodiment of this invention; and Fig. 23 is a fragmentary vertical section, similar to a portion of Fig. 6, illustrating on an enlarged scale certain features of the embodiment of Fig. 22.

The derrick shown and described herein has particular utility as a pole derrick for placing and pulling telephone poles and the like, and will be described as such, although it may be used for many other purposes where it is necessary to lift heavy objects, and where a light-weight, easily portable unit is needed. Such a derrick may be mounted upon a truck T, of a conventional type which includes side panels 20 upstanding from the bed 21 rearwardly of the operators' cab 22. The conventional pole derrick previously described is simply a two-legged boom, the lower ends of the legs of which are attached to the rear end of the truck bed 21 with a third leg extending from the top of the boom to a point of attachment to the truck bed 21 adjacent cab 22, which thereby maintains the boom in the same fixed position except when the third leg or a portion thereof is detached from the truck bed and its lower end placed on the ground behind the truck to provide a ground support for the boom when pulling poles and the like. A power winch 23 is mounted upon the bed 21 behind the cab 22 with a hoisting cable 24 wound thereon and adapted to be extended and threaded over a sheave mounted at the upper end of the boom, and is used for hoisting with the conventional derrick and also the derrick D of this invention. For use with the latter, and in further accordance with this invention, a guy cable 25 is connected with the top of the boom B to hold it at a selected inclination when in use, such as shown in Fig. 2. Cable 25 may be attached to the truck near the front end of the bed or the winch 23 may be a double drum winch adapted to operate guy cable 25 as well as hoisting cable 24. The derrick D includes a mounting section M or frame which is attached to the rear ends of the panels 20 and on which the boom B is mounted in a manner which permits it to extend outwardly and rearwardly therefrom when in use, to be swung over the top thereof to a flat position over the truck, above the panels 20 and cab 22 for storage, and to be swung back again to the rear position for subsequent use.

The mounting section M which supports the boom B includes a pair of upright angle bars 26, one leg of each of which extends rearwardly and the other leg of each is attached to the rear upright edge of a side panel 20. It will be understood that the side panel construction of the truck is sufficiently rigid to withstand the operative strains and stresses encountered with the derrick in operation, but that the angles 26 may be suitably braced or reinforced in any suitable manner. The top of each angle 26 extends above the top of the side panel 20 to which it is attached and at its upper end is mounted a bracket 27, a portion of which extends forwardly from the angle 26 (that is, toward the forward end of the truck) to carry a transverse shaft 28 which is received in a transverse aperture in each bracket and which extends across the truck forwardly of the angles. Shaft 28 may also be termed a draw bar, because of its use in moving the boom between operating and storage positions. Another portion of each bracket 27 extends rearwardly of the angle 26, and is provided with a transversely extending orifice at a level slightly below that of the transverse shaft 28. A pin 29 is slidably mounted in each of these orifices, and is movable outwardly or inwardly within the bracket to clear or to engage the boom in a manner hereinafter described.

The boom B may be formed as a simple A-frame and includes a pair of legs 30 which are connected at the top and spaced apart at the base for attachment to the angles 26 through links 43, as hereinafter described. The upper ends of the legs 30 may be flattened, and provided with aligned holes through which a pin 31 extends to connect the upper ends of the legs 30 together and also to provide a shaft or pin for a sheave 32, mounted between the legs at the apex, as in Fig. 4. The sheave 32 may be of any desired type, and is conveniently enclosed within housing 33, the rear end of which extends between the legs 30, in accordance with this invention, to carry a guide pulley 34, mounted on a pin 36. Guide pulley 34 tends to be aligned by the cable 24 with the sheave. On the opposite side of the sheave, housing 33 carries a pair of guide rollers 35, mounted at each side of the housing in position to engage the cable as it passes to and from the sheave. One end of pin 36 for pulley 34 is conveniently connected with the guy cable 25, which holds the boom at a selected inclination when in use.

The legs 30 of the boom may be formed of pipe or tubing, as is also a central reinforcing leg which includes a tube 37 having a clevis 38 at one end which embraces the sheave body 33 and is pivotally connected to the pin 31. Tube 37 telescopes into a lower tube 39, which in accordance with this invention is connected with a tubular bar 40 which extends between the legs 30 and is connected at each end to a collar 40a, mounted on the respective leg 30. Bar 40 is provided at its center with a cup 41 which receives the lower end of tube 39, the latter of which is provided with a series of holes, as in Fig. 3 and tube 37 with a corresponding series of holes for insertion of a pin to connect tubes 37 and 39 together. By removal of this pin, tube 39 may be slid upwardly on tube 37 and then out of cup 41, so as to provide a ground support for the boom, as in the manner shown in Fig. 12. Such ground support of the boom is desirable for pulling poles and handling heavy loads, the holes in tubes 37 and 39 providing desirable adjustments in the height of the support, through insertion of a pin through holes at a desired position to obtain a selected height.

The base of each leg 30 is preferably flattened and sized, and provided with a hole therethrough for a bushing 42, as in Figs. 3 and 7, to provide a pivot connection with one end of a link 43, each bushing 42 being conveniently attached to the link 43. The other end of each link 43 is pivotally connected by a pin 44 to the rearwardly extending flange of an angle 26 at a medial position thereon. A reinforcing bracket, engaging the opposite end of pin 44 and corresponding to bracket 45 for bushing 42, may be welded to the transverse leg of each angle 26, if desired. Also, a tubular bushing 47 may extend between the flange of angle 26 and bracket 45, so that shaft 28 may be removed from its upper position and placed in bushings 47, to permit the cable 24 to be used as a drag line. The length of links 43 is such that the base of the legs 30 will be near the bottom of the frame M and against the angles 26 with the boom in an inclined operative position extending rearwardly from the truck T, as in Fig. 2, and also such that the legs 30 may be swung upwardly to place the boom in a flat storage position extending forwardly along the top of the truck, as in Fig. 1. Referring again to Fig. 7, a reinforcing bracket 45 may be welded to each angle 26 and parallel with the rear flange thereof, so that the pivotal connection between a leg 30 and bar 43 will lie between the bracket 45 and the flange of angle 26 with the boom in operative position. Aligned holes 46 extend through the flange of angle 26 and bracket 45, and in said operating position register with the control hole in bushing 42, so that each leg of the boom may be locked to the truck by a removable pin 48, which may be attached to a chain to prevent loss thereof.

When the boom is so locked to the truck, it may be held at any selected inclination by the guy cable 25. The outer end of this cable is connected to the shaft 36 at the apex of the boom, as described previously, while the inner end may be provided with a chain 49 for adjustable connection to an upstanding stanchion 50 mounted near the forward end of the truck bed 21. The connection to stanchion 50 may be in any conventional manner, that shown being by the length of chain 49 at the end of the guy cable 25, which is threaded through a link-locking, slotted orifice 51 in the stanchion, shown in Figs. 1 and 2. With the derrick in the operating position, as illustrated at Fig. 2, the boom is supported by the guy cable and if a change in position of the boom is desired, the end of cable 24 is attached to one of the legs 30, as by attachment to a hook 54, and the boom is raised by cable 24 to permit chain 49 to be adjusted in stanchion 50, and cable 24 is then run out until the boom is supported by guy cable 25. As will be evident from Fig. 3, guy cable 25 may extend centrally of the truck, with stanchion 50 located in a corresponding position centrally between the truck sides. Winch 23 may be mounted to one side of the truck bed, such location permitting cable 24 to run on and off the winch without interference by cable 25.

In accordance with this invention, the boom lies in storage position over the truck. In this position, as shown in Fig. 1, the links 43 are swung upwardly and the legs 30 of the boom near the base rest upon the forwardly offset, transverse shaft 28, which thus provides a support for the boom, while the apex of the boom extends over the forward end of the truck with the legs 30 near the apex resting upon the upper, transversely disposed portion of an inverted, U-shaped bracket 52 mounted at a forward position on the truck, such as by attachment to the front ends of the panels 20. A pair of ears 53 upstand from the center of the upper portion of bracket 52, with a spacing therebetween suitable to contact or nearly contact each side of the central leg tube 37 and thereby prevent lateral shifting of the boom when resting on the bracket, as during movement of the truck.

The cable 24 engages pulley 55 pivoted on the transverse bar 28, and movable therealong as the cable moves from side to side on the winch drum. Pulley 55 may be mounted between a pair of plates 56 which form an encased unit, extending from each side of the pulley 55 to carry a retaining pulley 57 which is spaced with respect to the pulley 55 to hold the cable in position between the pulleys. The retaining pulley 57 will also carry the cable 24 when the end of the boom is lower than a line extending from the winch to pulley 55, such as when the end of the boom is lowered to or operating at a distance above ground level less than that shown in Fig. 12.

In further accordance with this invention, the boom is moved from the storage position to the operating position, by pulling the hoist cable 24 with the winch 23 in a simple, effortless manipulation. Of course, any other suitable power means, such as acting between shaft 28 and the boom, may be utilized. The first step of such operation is to move the pins 29 inwardly to the position of Fig. 9, if not already in such position. Next, the outer end of the hoist cable 24 is attached to a leg of the boom, as at a hook 54 which may be located at any desired position on either one of the legs 30, or at different elevations on the opposite legs, as shown in Fig. 2. The cable 24 is then retracted by the winch 23 to cause the cable to tighten against the sheave 55 at the apex of the boom, and the cable 24 is then operative to move the boom. In pulling the boom upwardly and then rearwardly from the storage position to the operating position, the boom will be in succeeding positions illustrated in Figs. 8 and 9, moving in the direction of the arrows. Commencing with the boom resting on the bracket 52 and shaft 28, the storage position of Fig. 1, the cable 24 is pulled inwardly on the winch 23 to pull the boom upwardly with the legs 30 sliding down the shaft 28 and then engaging the pins 29, as in the dash position of Fig. 8. As the boom moves downwardly and rearwardly, the links 43 will pivot downwardly, and the pins 29 will cause the boom to "break" over the top to an upright position. The weight of the boom will then cause the boom and links 43 to slide downwardly to the full position of Fig. 8. Then, the winch is operated in the opposite direction, to release cable 24, whereupon the boom is permitted to fall rearwardly, as to the dotted position of Fig. 8. Then, pins 48 may be inserted and guy cable 25 may be adjusted to hold the boom in the desired position for use. After the boom is held by guy cable 25, which will usually pass above shaft 28 but may pass below, depending upon the desired position of the boom, cable 24 may be slackened, the end thereof detached from the hook 54, and the derrick is ready for operation.

In accordance with this invention, the boom is also moved from operating position to storage position by a simple, effortless manipulation. Pins 48 are, of course, removed, and after the end of cable 24 is attached to one of the hooks 54, the pins 29 are shifted outwardly to the position of Fig. 11. Then, cable 24 is pulled in by the winch and the boom is moved upwardly, as from the dotted position of Fig. 10 toward the full position thereof. As the boom approaches an upright position, the forward component of the pull of cable 24, due to the slightly forward spacing of the rear edge of pulley 56 from the vertical centerline of pivot pin 44, will pull the boom forwardly against the bar 28. Then, the weight of the boom, the center of gravity of which will be above shaft 28 and forwardly thereof when the boom engages shaft 28, will cause the lower end of the boom and links 43 to shift to the full position of Fig. 8. The winch may then be stopped and turned in the opposite direction to permit the boom to fall slowly to the storage position of Fig. 1. After the boom reaches the storage position, the pins 29 are moved inwardly, so that they will not form lateral projections while the truck is moving, as through traffic, from one point to another.

In the embodiment of this invention illustrated in Fig. 13, a derrick D' is mounted at the front of the truck T. In this arrangement, the boom B is unchanged, but the mounting section M' or supporting frame is modified in that angles 26' are mounted on the bumper 58 of the truck, or other suitable base, and extend upwardly therefrom, being held in position by longitudinal braces 59 which extend rearwardly of the truck to a bracket 52' or other suitable structure. The bracket 52' is similar to bracket 52 of Figs. 1 and 3, and upstands from the truck at a selected position, as by attachment to the front ends of panels 20. A transverse shaft 60, on which a sheave 61 is mounted to guide the cable 24 from the winch 23 to the sheave 55 on the shaft 28, conveniently extends between the vertical legs of bracket 52'. The operation of the unit is the same as hereinbefore described, except that with respect to the truck the boom is swung forwardly rather than rearwardly to operating position, and guy cable 25' engages shaft 60. The anchor 50 for the guy cable 25' may be mounted on truck bed 21 adjacent winch 23, as before, or in any other suitable position. Or, winch 23 may be a double drum winch, as indicated previously, adapted to operate guy cable 25 as well as hoisting cable 24, each independently. Other parts indicated by the same reference numerals may, of course, be identical with those previously described.

The embodiment of this invention illustrated in Figs. 14 and 15 requires the attachment of a fixed link 68 between each leg 30 and link 43 for moving the boom between storage and operating position, and is therefore less advantageous than the embodiments previously described. However, the construction is somewhat simplified in that in the mounting section M'', simpler brackets 27a may be mounted on the angles 26 to carry the shaft 28 in a position forwardly of the vertical centerline of pivot pins 44 for links 43. As before, a pulley 55 is mounted on shaft 28, a second pulley similar to pulley 57 of Fig. 5 being provided, if desired. Thus, to move the boom, which may include legs 30 and other parts as described previously, from the storage position shown in full in Fig. 15 to the operating position of Fig. 14, the links 68 are attached to each leg 30 and link 43, as indicated, and the boom elevated by pulling in on cable 24, as before. The fixed link 68 will cause the boom to "break" over center, as to the dotted position of Fig. 15, whereupon the winch may be reversed and the cable 24 released, to permit the boom to pivot rearwardly to the position of Fig. 14. After the pins 48 have been inserted, the links 68 may be removed and a guy cable utilized to support the boom. For returning the boom from the operating position of Fig. 14 to the storage position shown in full in Fig. 15, the cable 24 is attached to one of the boom legs, as before, and as cable 24 is pulled in, the legs 30 will pivot rearwardly until they strike shaft 28, and the winch then reversed to permit the boom to be lowered to storage position. In the event shaft 28 is not located sufficiently forwardly, by pulling forwardly on a line previously attached to the upper end of the boom, as by a workman, the boom may be pulled across dead center and then lowered to storage position by the winch. However, through bracket 27a attached to the upper ends of each angle 26, shaft 28 may be disposed forwardly of the vertical centerline of pins 44, so that the boom may be moved between operating and storage positions without the necessity for pulling it across dead center.

In the embodiment of this invention illustrated in Figs. 16-18, the derrick includes a boom having legs 30 and other parts similar to the boom B of Figs. 1-3, the lower ends of legs 30 being similarly pivotally connected to links 43, which in turn are pivoted at their opposite ends by pins 44 on angles 26. Also, a bracket 52 may be provided to support the forward end of the boom when in the storage position of Fig. 16, with the parts of truck T having the same reference numerals being similar to the parts shown in Figs. 1-3. The movement of the boom between the operating position of Fig. 17, shown also in dot dash lines in Fig. 16, is similar to that previously described; that is, shaft 28 is mounted on a bracket 27b so as to be located forwardly of the vertical centerline of pivot pins 44 for links 43, so that the boom may be pulled from the dot dash to the dotted position of Fig. 16 and then back to a position against the shaft, as to the dotted position of Fig. 18. The boom may then be lowered to storage position, as described previously. However, for moving the boom between storage and operating positions, a cam 70 is attached to each leg 30 of the boom, the contact edge of each cam 70 being inclined away from the leg 30 and upwardly thereof. Cams 70 are positioned on legs 30 at a point such that the cams will engage shaft 28 when the boom approaches a vertical position, when pulled upwardly from storage position, to push the boom away from the shaft 28 as the boom moves to vertical position and "throw" the boom over dead center, after which it will be pulled by gravity to the full position of Fig. 18. Each cam 70 may be carried by a tubular sleeve 71 which is rotatably but non-slidably mounted upon the leg 30, as between stops 72, while a pin 73 may be inserted through a hole in the sleeve and into a selected hole in the leg 30, not shown, the latter holes respectively registering with the pin 73 when the sleeve is rotated to place cam 70 in shaft engaging position as in Fig. 16, or in a side position, shown in Fig. 17. As will be evident, in the side position of Fig. 17, wherein the cams 70 are turned to the inside, cams 70 will not contact the shaft during movement over the shaft. However, during the latter movement, the side portions of sleeves 71 at 90° to the cams 70 will engage the shaft 28, and this side of each sleeve 71 is preferably beveled at each end to permit smooth movement thereof over shaft 28.

In the embodiment of this invention illustrated in Figs. 19–21, the shaft 28 is shiftable between its position in Figs. 1–3 and the position of pins 29 thereof, so that in the latter position of the shaft, the boom will engage the shaft in the same manner as it previously engaged the pins 29, when the boom is being shifted from the storage position to the operating position. For this purpose, the opposite ends of shaft 28 may be mounted on a lever 75 which is pivoted on a pin 76, in turn mounted on a plate 77 which is attached, as by welding, to the upper end of an angle 26'. Lever 75 is provided with a handle 78 for moving the shaft 28 between the positions of Figs. 19 and 21, and is locked in the respective positions by a removable pin 79, which may be attached to the lever by a chain to prevent loss and which is inserted in a hole 80 or 81 in plate 77 for the respective positions. The center of movement of lever 75, at pin 76, may be disposed beneath the forward position of shaft 28, i. e., the position of Fig. 19, to facilitate movement from the forward to the rear position when the lower ends of legs 30 rest on the shaft in storage position. As will be evident, the rear position of shaft 28 may be lower than its forward position, so that less effort will therefore be required to pivot the shaft 28 to a lower position when a portion of the weight of the boom is thereon. Handle 78 may extend in any desired direction from lever 75 and also may be mounted on the outside of the truck, but is preferably mounted inside the truck and disposed so that it will extend directly downwardly during normal use. Thus, after the boom has been swung from storage to operating position, the handle 78 and lever 75 are shifted back to the position of Fig. 21, wherein the handles 78 will interfere least with access to supplies or equipment stored in panels 20. With this position of handle 78, shaft 28 need not be shifted to move the boom back to storage position. Also, when it is again desired to move the boom from storage to operating position, it is comparatively easy to shift the position of shaft 28 to the rear, it being noted that handle 78 will then extend forwardly into the space in the truck, but this position of handle 78 need be maintained only until the boom has reached an operating position.

In the embodiment of this invention illustrated in Figs. 22 and 23, shaft 28 may be maintained in a fixed position, as by extending between brackets 27d and offset slightly forwardly from the angles 26, if desired, to permit the boom to move past center before contacting the shaft 28 during movement from operating to storage position. However, a selective offsetting force which pulls the boom past the center point in each direction is produced by attaching the cable 24 to offset anchor means, such as provided by a longitudinally extending bar 84 at one side and attached to one angle 26 adjacent the bracket 27d. Bar 84 is provided at its opposite ends with hooks 85 and 85', which are respectively offset forwardly and rearwardly from the vertical centerline of pins 44 a sufficient distance to provide a positive component of force in the desired direction with the end of cable 24 attached thereto. Thus, with the end of cable 24 attached to the forward hook 85, as shown in the full position of Figs. 22 and 23, when the cable is pulled in, the boom will be raised from the operating position to a vertical position, and then positively across dead center, after which the boom may be lowered to the storage position. Similarly, with the end of the cable 24 attached to the hook 85', as shown in broken lines, when the cable 24 is pulled in, the boom will be raised from storage position to a vertical position and then positively across dead center, after which the boom may be lowered to operating position. As will be evident, when the end of cable 24 is attached to hook 85 or 85', a two to one mechanical advantage is obtained, so that movement of the boom is more readily controlled. It will be evident that hook 85 may be mounted on the panel 20, leaving hook 85' to be supported by a bracket extending rearwardly, and that other ways of positioning and supporting hooks 85 and 85' may be utilized. A hook may also be mounted forwardly of the shaft 28, as on panel 20 or in any other suitable manner, for the embodiment of Fig. 14, so that the free end of cable 24 may be attached thereto when the boom is being moved between operating and storage positions.

In addition to the embodiments and modifications described above, the embodiment of Figs. 1-3 may be adjustable to accommodate differences in the position of the center of gravity of the boom B, as by bolting the brackets 27 to angles 26, and shifting the brackets forwardly, for instance, if the center of gravity of the boom is shifted rearwardly, to permit the boom to tip further forwardly before engaging the shaft 28 for movement from operating to storage position. Such a shift in the center of gravity of the boom may occur when a heavy tool, such as a post hole digger, is attached to the rear side of the boom, as by clamping to the boom, so that it will remain attached to the boom and may be transported atop the truck while attached to the boom.

As will be evident, a derrick constructed in accordance with this invention fulfills to a marked degree the requirements and objects hereinbefore set forth. The simplicity of movement between storage and operating positions and vice versa will be evident from the above descriptions thereof. A large majority of the parts involved are readily made, as by torch cutting and welding, and the remainder are readily procurable. The principal parts of a previous type of derrick, which required complete assembly and disassembly for use and storage, respectively, may be utilized, so that conversion for those already having such derricks is economical. However, the entire derrick may be made without undue expense. It will be understood, of course, that the design of various parts may be altered considerably and that the derrick of this invention may be mounted on other types of trucks. Thus, although different embodiments of this invention have been illustrated and described, it will be understood that other embodiments may exist, and various charges made therein, all without departing from the spirit and scope of this invention.

What is claimed is:

1. A derrick for a truck having a cable winch mounted thereon, comprising an upright frame mounted at one end of the vehicle and including a pair of vertically extending supports at each side, a bracket at the upper end of each support and a shaft extending between said brackets in a position offset from the center of said support toward said winch; a pin mounted for lateral horizontal movement in each said bracket at a position offset from the center of said bracket in a directtion away from said winch, said pins being movable inwardly and outwardly; a boom including a pair of legs connecting at their upper ends and diverging to their lower ends, a cross member extending between said legs and provided with a socket at the center thereof and a third leg formed of telescoping members pivoted at their top to the upper end of said boom and received at the lower end in said socket, the lower ends of said side legs being flattened and provided with pivot holes and the upper end of said boom being provided with a sheave and a bracket for a pulley spaced rearwardly from said sheave; a pair of links, each said link being pivotally attached at one end to a support at an intermediate position and at the opposite end to the lower end of a boom leg; a bushing having a central hole therethrough pivotally connecting the said opposite end of each link with the lower end of the corresponding boom leg; a removable pin for attaching each said bushing to said support and thereby pivotally attach the lower ends of said boom legs to said supports; an inverted U-shaped bracket having an upper horizontal cross bar mounted on said truck in spaced position from said supports, said boom resting on said shaft and on said horizontal bracket bar in storage position, said bar being provided with spaced upstanding ears in a central position to receive the center leg of said boom therebetween; a pulley mounted on said shaft; a pair of plates, one at each side of said pulley, and extending outwardly therefrom in one direction; a guide pulley pivotally mounted on said plates in spaced relation to said shaft pulley, said winch cable extending between said shaft pulley and said guide pulley and around said boom sheave, at least one leg of said boom being provided with a hook for attachment of the free end of said cable; a guy cable attached at its upper end to said guide pulley bracket at the upper end of said boom; a chain attached to the lower end of said guy cable; and a link slotted stanchion mounted on said truck for adjustably securing said guy cable chain.

2. A derrick for a truck having a cable winch mounted thereon comprising an upright frame mounted at one end of the vehicle and including a pair of vertically extending supports at each side and a shaft extending between the upper ends of said supports; a boom including a pair of legs connecting at their upper ends and diverging to their lower ends, a cross member extending between said legs and provided with a socket at the center thereof and a third leg formed of telescoping members pivoted at their top to the upper end of said boom and received at the lower end in said socket, the lower ends of said side legs being flattened and provided with pivot holes and the upper end of said boom being provided with a sheave and a bracket for a pulley spaced rearwardly from said sheave; a pair of links, each said link being pivotally attached at one end to a support at an intermediate position and at the opposite end to the lower end of a boom leg; a bushing having a central hole therethrough pivotally connecting the said opposite end of each link with the lower end of the corresponding boom leg; a removable pin for attaching each said bushing to said support and thereby pivotally attach the lower ends of said boom legs to said supports; a second pair of links, each removably attached between one of said first links and the corresponding leg boom adjacent the lower end of the latter to hold the same together in fixed relation; an inverted U-shaped bracket having an upper horizontal cross bar mounted on said truck in spaced position from said supports, said boom resting on said shaft and on said horizontal bracket bar in storage position, and said bar being provided with spaced upstanding ears in a central position to receive the center leg of said boom therebetween; a pulley mounted on said shaft; a pair of plates, one at each side of said pulley, and extending outwardly therefrom in one direction; a guide pulley pivotally mounted on said plates in spaced relation to said shaft pulley, said winch cable extending between said shaft pulley and said guide pulley and around said boom sheave, at least one leg of said boom being provided with a hook for attachment of the free end of said cable; a guy cable attached at its upper end to said guide pulley bracket at the upper end of said boom; a chain attached to the lower end of said guy cable; and a link slotted stanchion mounted on said truck for adjustably securing said guy cable chain.

3. A derrick for a truck having a cable winch mounted thereon comprising an upright frame mounted at one end of the vehicle and including a pair of vertically extending supports at each side and a shaft extending between the upper ends of said supports in a position offset from the center of said support toward said winch; a boom including a pair of legs connecting at their upper ends and diverging to their lower ends, a cross member extending between said legs and provided with a socket at the center thereof and a third leg formed of telescoping members pivoted at their top to the upper end of said boom and received at the lower end in said socket, the lower ends of said side legs being flattened and provided with pivot holes and the upper end of said boom being provided with a sheave and a bracket for a pulley spaced rearwardly from said sheave; a pair of links, each said link being pivotally attached at one end to a support at an intermediate position and at the opposite end to the lower end of a boom leg; a bushing having a central hole therethrough pivotally connecting the said opposite end of each link with the lower end of the corresponding boom leg; a removable pin for attaching each said bushing to said support and thereby pivotally attach the lower ends of said boom legs to said supports; a cam mounted on each side leg of said boom in position to engage said shaft when said boom is moved from storage position to a position outwardly from said truck; a collar for supporting each said cam and pivotal about said leg; stops on said boom legs for restricting longitudinal movement of said collars; a pin for removably securing each said collar to said leg in selective positions, including a position in which said cam will engage said shaft and a position in which said cam will not engage said shaft; an inverted U-shaped bracket having an upper horizontal cross bar mounted on said truck in spaced position from said supports, said boom resting on said shaft and on said horizontal bracket bar in storage position, and said bar being provided with spaced upstanding ears in a central position to receive the center leg of said boom therebetween; a pulley mounted on said shaft; a pair of plates, one at each side of said pulley, and extending outwardly therefrom in one direction; a guide pulley pivotally mounted on said plates in spaced relation to said shaft pulley, said winch cable extending between said shaft pulley and said guide pulley and around said boom sheave, at least one leg of said boom being provided with a hook for attachment of the free end of said cable; a guy cable attached at its upper end to said guide pulley bracket at the upper end of said boom; a chain attached to the lower end of said guy cable; and a link slotted stanchion mounted on said truck for adjustably securing said guy cable chain.

4. A derrick for a truck having a cable winch mounted thereon, comprising an upright frame mounted at one end of the vehicle and including a pair of vertically extending supports at each side, a bracket at the upper end of each support, a lever pivotally attached to each bracket at a position offset from the center of said support toward said winch and a shaft extending between said levers above the pivot points thereof and movable between positions offset from the center of said support respectively toward and away from said winch, said lever having a handle extending directly downwardly from said pivot point with said shaft positioned toward said winch; a boom including a pair of legs connecting at their upper ends and diverging to their lower ends, a cross member extending between said legs and provided with a socket at the center thereof and a third leg formed of telescoping members pivoted at their top to the upper end of said boom and received at the lower end in said socket, the lower ends of said side legs being flattened and provided with pivot holes and the upper end of said boom being provided with a sheave and a bracket for a pulley spaced rearwardly from said sheave; a pair of links, each said link being pivotally attached at one end to a support at an intermediate position and at the opposite end to the lower end of a boom leg; a bushing having a central hole therethrough pivotally connecting the said opposite end of each link with the lower end of the corresponding boom leg; a removable pin for attaching each said bushing to said support and thereby pivotally attach the lower ends of said boom legs to said supports; an inverted U-shaped bracket having an upper horizontal cross bar mounted on said truck in spaced position from said supports, said boom resting on said shaft and on said horizontal bracket bar in storage position, said bar being provided with spaced upstanding ears in a central position to receive the center leg of said boom therebetween; a pulley mounted on said shaft; a pair of plates, one at each side of said pulley, and extending outwardly therefrom in one direction; and a guide pulley pivotally mounted on said plates in spaced relation to said shaft pulley, said winch cable extending between said shaft pulley and said guide pulley and around said boom sheave, at least one leg of said boom being provided with a hook for attachment of the free end of said cable.

5. A derrick for a truck having a cable winch mounted thereon comprising an upright frame mounted at one end of the vehicle and including a pair of vertically extending supports at each side and a shaft extending between the upper ends of said supports; a boom including a pair of legs connecting at their upper ends and diverging to their lower ends, a cross member extending between said legs and provided with a socket at the center thereof and a third leg formed of telescoping members pivoted at their top to the upper end of said boom and received at the lower end in said socket, the lower ends of said side legs being flattened and provided with pivot holes and the upper end of said boom being provided with a sheave and a bracket for a pulley spaced rearwardly from said sheave; a pair of links, each said link being pivotally attached at one end to a support at an intermediate position and at the opposite end to the lower end of a boom leg; a bushing having a central hole therethrough pivotally connecting the said opposite end of each link with the lower end of the corresponding boom leg; a removable pin for attaching each said bushing to said support and thereby pivotally attach the lower ends of said boom legs to said supports; an inverted U-shaped bracket having an upper horizontal cross bar mounted on said truck in spaced position from said supports, said boom resting on said shaft and on said horizontal bracket bar in storage position, and said bar being provided with spaced upstanding ears in a central position to receive the center leg of said boom therebetween; a pulley mounted on said shaft; a pair of plates, one at each side of said pulley, and extending outwardly therefrom in one direction; a guide pulley pivotally mounted on said plates in spaced relation to said shaft pulley, said winch cable extending between said shaft pulley and said guide pulley and around said boom sheave; and a substantially horizontal bar mounted on one of said supports adjacent the upper end thereof and extending forwardly and rearwardly therefrom, said bar having a hook at each end for attachment of the free end of said winch cable.

6. A derrick for a vehicle, including an upright frame mounted on the vehicle at one end thereof; a boom extending from the bottom of the frame outwardly from the end of the vehicle in operating position and lying above the frame and over the vehicle in storage position; means adjacent the top of said frame for at least partially supporting said boom; a link having one end pivotally connected to the base of the boom and the other end pivotally connected to the frame at an intermediate position between said supporting means and the bottom of the frame, said link rotating upon the frame to permit the base of the boom to shift from the bottom of the frame to a position adjacent the top thereof as an incident of shifting the boom between the operating and the storage position and also to permit the base of the boom to shift from a position adjacent the top of the frame to the base thereof as an incident of shifting the boom between the storage and the operating position; means for urging said boom past dead center as said boom moves between storage position and operating position; and means for urging said boom past dead center as said boom moves between operating position and storage position, said boom longitudinally movably engaging said supporting means during at least part of the movement to storage position.

7. A derrick for a vehicle, as defined in claim 6, wherein said boom supporting means includes a member extending laterally and offset toward said vehicle from the pivotal connection of said link with said frame, said boom longitudinally movably engaging said member during at least part of movement thereof to storage position.

8. A derrick for a vehicle, as defined in claim 7, including power means acting between said member and said boom.

9. A derrick for a vehicle, as defined in claim 8, wherein said power means includes a cable, a winch, a first pulley for said cable at said offset member and a second pulley for said cable adjacent the outer end of said boom; and wherein each said means for urging said boom past dead center includes an anchor for the end of said cable which extends from said second pulley, one said anchor being offset toward said vehicle and the other said anchor being offset away from said vehicle, each with respect to the pivot point of said link on said frame.

10. A derrick for a vehicle, as defined in claim 6, wherein said means for urging said boom past dead center during movement between storage position and operating position includes a member having a laterally disposed boom engaging position adjacent the upper end of said frame but offset from the pivot point of said link on said frame in a direction away from said vehicle and over which member said boom moves longitudinally during movement past dead center in moving from storage to operating position.

11. A derrick for a vehicle, as defined in claim 10, wherein said boom engaging member comprises a laterally movable pin.

12. A derrick for a vehicle, as defined in claim 10, including means for supporting said member for alternative positioning offset away from said vehicle and offset toward said vehicle from the pivot point of said link on said frame, said member in said position offset toward said vehicle forming at least a portion of said boom supporting means.

13. A derrick for a vehicle, as defined in claim 10, wherein said means for urging said boom past dead center when shifting between storage position and operating position includes a second link extending between said boom and said first mentioned link to form a rigid structure consisting of said boom, said first mentioned link and said second link; and means for detachably connecting said second link between said boom and said first mentioned link.

14. A derrick for a vehicle, as defined in claim 10, wherein said means for urging said boom past dead center as said boom moves between storage position and operating position includes a cam on said boom selectively movable to different positions, in one of which positions said cam engages said member and thereby urges said boom past dead center as said boom moves between storage position and operating position, and in another of which positions said cam is prevented from engaging said member but permits said boom to engage said member as said boom moves between operating position and storage position.

15. A derrick for a vehicle comprising, in combination, an upright frame mounted upon an end of the vehicle; a boom extending from the bottom of the frame outwardly from the vehicle in operating position and extending over the vehicle in storage position; a transverse shaft at the top of the frame over which the boom moves longitudinally, said shaft being normally offset toward the center of said vehicle; pivoted link means interconnecting the base of the boom with an intermediate point on the frame and below said shaft to permit the base of the boom to shift from the bottom of the frame and upwardly as the boom moves over said shaft from the operating to storage position; cable means attached to said boom for pulling said boom upwardly from operating position, for pulling said boom upwardly from storage position and for lowering said boom from positions past dead center to said storage and operating positions; and means movable to a position to permit said boom to longitudinally movably engage said shaft while in said normally offset position during movement to storage position, said means being movable to another position in which said boom is prevented from engaging said shaft in said normally offset position and said boom is forced past dead center when moving from storage to operating position.

16. A derrick for a vehicle, as defined in claim 15, wherein said movable means comprises a laterally movable pin; and means for supporting said pin in a substantially horizontal position adjacent the upper end of said frame and offset from said frame and away from the center of said vehicle, said pin being movable to a boom engaging position in which said boom slidably engages said pin when moving past dead center during movement between storage and operating position, said pin being also movable to another position in which said boom clears said pin and thereby engages said shaft during movement between operating and storage position.

17. A derrick for a vehicle, as defined in claim 15, wherein said movable means comprises a link which is shorter than said pivoted link means and is fixed between said boom and said pivoted link means so as to form a rigid structure consisting of said link, said boom and said pivoted link means during movement of said boom between storage and operating position; and means for detachably connecting said link between said boom and said pivoted link means.

18. A derrick for a vehicle, as defined in claim 15, wherein said movable means comprises a cam mounted for pivotal movement on said boom and pivotal between shaft engaging and shaft clearing positions, said cam having an inclined shaft engaging surface, one end of which is spaced from said boom a distance sufficient, when said cam is in shaft engaging position, to force said boom past dead center as said boom moves between storage and operating position.

19. A derrick for a vehicle, as defined in claim 15, wherein said movable means comprises a pair of levers adjacent the opposite ends of said shaft, the upper end of each lever being attached to said shaft and each lever being pivoted on said frame below said shaft and movable in an upright plane transverse to said shaft, said levers being movable between a position in which said shaft is disposed toward the center of said vehicle and a position in which said shaft is disposed away from the center of said vehicle, each such position being with respect to the pivot point of said pivoted link means on said frame.

References Cited in the file of this patent

UNITED STATES PATENTS

| Number | Name | Date |
|---|---|---|
| 1,613,187 | Mullen | Jan. 4, 1927 |
| 1,882,375 | Vanderveld | Oct. 11, 1932 |
| 2,239,924 | McFarlane et al. | Apr. 29, 1941 |
| 2,336,965 | Shoemaker | Dec. 14, 1943 |
| 2,541,970 | Prospisil | Feb. 13, 1951 |
| 2,611,580 | Troche et al. | Sept. 23, 1952 |
| 2,634,831 | Haisch | Apr. 14, 1953 |
| 2,636,717 | Powers | Apr. 28, 1953 |